United States Patent [19]

Terayama et al.

[11] 3,952,891

[45] Apr. 27, 1976

[54] METHOD OF CONTAINERS HANDLING IN CONTAINER YARDS

[75] Inventors: Susumu Terayama, Okayama; Noriyoshi Mameda, Tamano, both of Japan

[73] Assignee: Mitsui Shipbuilding & Engineering Co., Ltd., Tokyo, Japan

[22] Filed: Feb. 27, 1974

[21] Appl. No.: 446,295

[52] U.S. Cl. .............................. 214/152; 214/12; 214/15 R
[51] Int. Cl.² .................................... B65G 63/00
[58] Field of Search ............ 214/152, 14, 12, 15 R, 214/16.4 A

[56] References Cited
UNITED STATES PATENTS

| | | | |
|---|---|---|---|
| 3,091,188 | 5/1963 | Graham | 214/14 X |
| 3,543,952 | 12/1970 | Young | 214/14 |
| 3,559,822 | 2/1971 | Lichtenford | 214/16.4 A |
| 3,608,750 | 9/1971 | Young et al. | 214/16.4 A |
| 3,631,993 | 1/1972 | Young | 214/16.4 A |

*Primary Examiner*—Robert J. Spar
*Assistant Examiner*—R. B. Johnson
*Attorney, Agent, or Firm*—Charles W. Helzer

[57] ABSTRACT

A container yard is provided with a first container handling machine installed in the transferring area of the yard, a second container handling machine free to move in the yard, a vehicle for transferring the container, a gate located in another transferring area of the yard, and a control center responsive to the input and output information of the containers for commanding and supervising the loading and unloading operations of the first and second machines and of the vehicle in the yard. The loading and unloading operations are controlled by a method comprising the steps of taking a corresponding sequence number to the container by the control center, the applied number being retained with the container for a predetermined period and effective only in the container yard, applying a predetermined vehicle number to the vehicle by the control center, the predetermined vehicle number being effective only in the yard and being displayed on said vehicle, displaying the container number and the vehicle number by display means mounted on the first and second loading and unloading machines, thereby enabling the drivers of the loading and unloading machines and the vehicle to mutually confirm the operation command from the control center by utilizing the container number and the vehicle number as a common key word.

4 Claims, 8 Drawing Figures

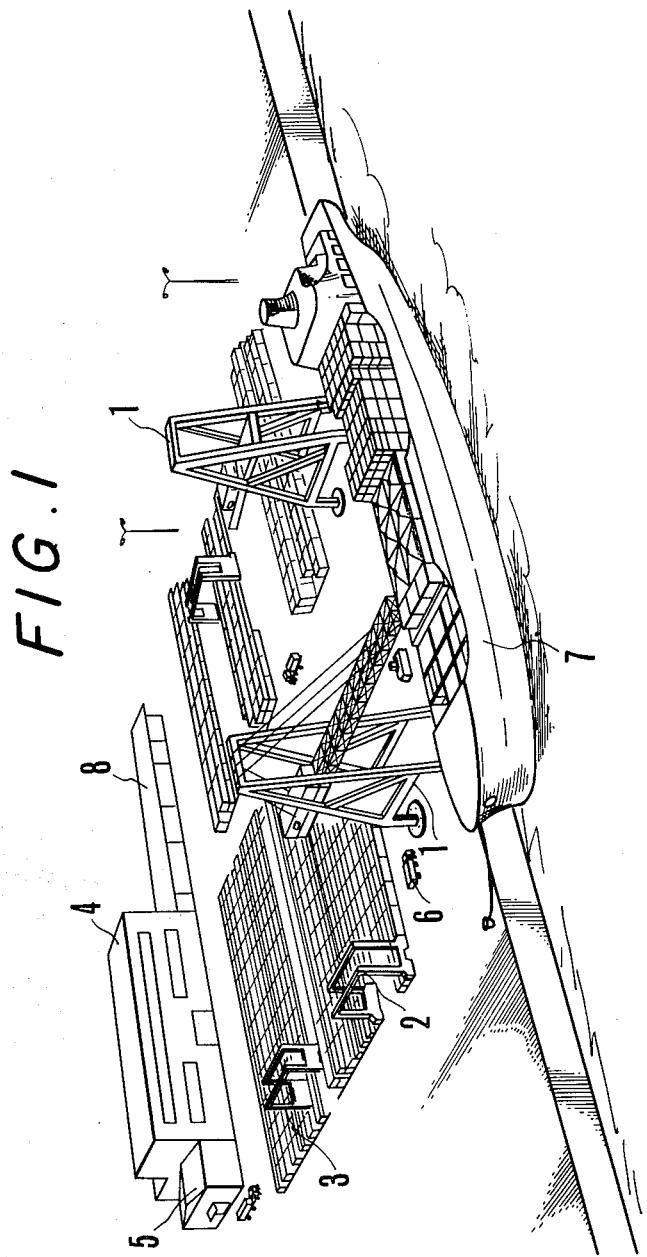

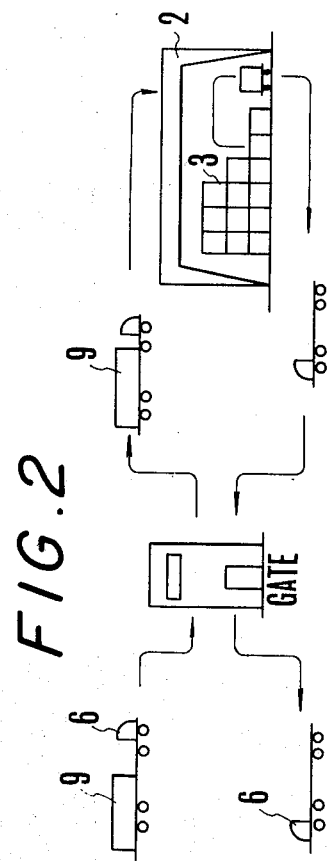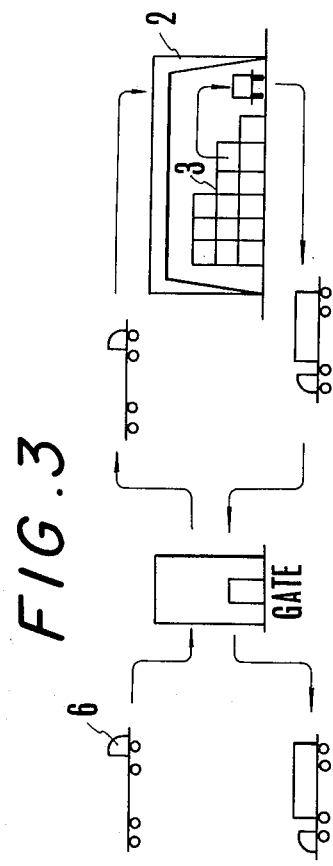

METHOD OF CONTAINERS HANDLING IN CONTAINER YARDS

BACKGROUND OF THE INVENTION

This invention relates to a method of handling containers in a container yard and more particularly to an improved method capable of preventing misoperation when collecting and stacking containers in a container yard and loading and unloading containers into and from container vessels.

Since the development of container transportation, use of the container transportation system is increasing constantly because of its high utility and efficiency. Because of this, the scale of the container yard where containers are collected, delivered, loaded on and unloaded from container ships is becoming larger and more complicated. However, at present the management of the container yard solely relies upon man power. In order to safely conduct receiving, delivering, loading and unloading operations of a large number of containers in a container yard, it is necessary to perform extremely complicated operations including processing of numerous slips, recording and renewal of ledgers, transmission of cargo handling command signals to loading and unloading machines, and preparation of reports regarding confirmation of completion of the cargo operation. With increasing size of the operations, the danger of misoperations is also increasing. These problems are inevitable due to the fact that it is difficult from the standpoint of engineering to automate material handling operations performed with container handling machines, that there is a limit for properly matching information and material flow (flow of containers) in such complicated systems as container yards, and that the activities of the supervisor of the yards, shippers, land and sea transporting companies and shipowners are restricted by traditional customs from the past. However, since the tendency toward enlarging the scale of the container yards is increasing year after year, even if rapid improvement is impossible, it is necessary to at least partially improve the management of the container yard.

In order to provide efficient management for the handling of extremely large number of containers, it is essential to identify correctly the particular numbers or symbols which are encoded arbitrarily by respective shippers, transporting companies and ship companies. Operations in the yard such as collection or stacking, loading, transshipment and delivery of the containers, should be performed only when such identification is correctly made. However, such individual numbers or symbols are arbitrarily selected by the owners of the container or shippers so that smooth cargo operation can not be assured unless a separate watchman is employed for reading such numbers or symbols, which is of course uneconomical. As the flow of the material (containers) increases, improvement in the turnover rate of the containers is of course advantageous for the efficient management of the yard. However such improvement can be accomplished only by increasing the number of operations thereby increasing, the possibility for misidentification of a container number causes troubles.

SUMMARY OF THE INVENTION

Accordingly, it is an object of this invention to provide an improved method of handling a large number of containers in a container yard which is capable of simplifying and speeding up the container handling operation without a corresponding increase in misoperations thus improving the turnover rate of the containers.

According to this invention there is provided a method of handling containers in a container yard which utilizes a first container handling machine installed in the sea side area of the container yard, a second container handling machine free to move in the yard, a vehicle for transferring the containers, a gate located at a convenient place in the yard, and a control center responsive to the input and output information concerning the containers for commanding and supervising the container handling operations of the first and second container handling machines and of the vehicle. The method is characterized by the steps of assigning a corresponding sequence number to the container by the control center, the sequence number being maintained for a predetermined period and effective only in the container yard, applying a predetermined vehicle number to the vehicle by the control center, the predetermined vehicle number being displayed on said vehicle and effective only in the control yard, displaying the container number and the vehicle number by display means mounted on the first and second container handling machines, thereby enabling the drivers of said machines and said vehicle to mutually confirm the operation command with respect to a desired container from the control center by utilizing the container number and the vehicle number as common key word.

BRIEF DESCRIPTION OF THE DRAWINGS

Further objects and advantages of the invention will be more fully understood from the following detailed description taken in connection with the accompanying drawings, in which:

FIG. 1 is a birds eye view of a sea side container yard showing a general arrangement thereof;

FIG. 2 is a diagram showing receiving paths for containers in a container yard;

FIG. 3 is a diagram showing delivery paths for containers from a contaner yard;

DESCRIPTION OF THE PREFERRED EMBODIMENT

Figure 4:
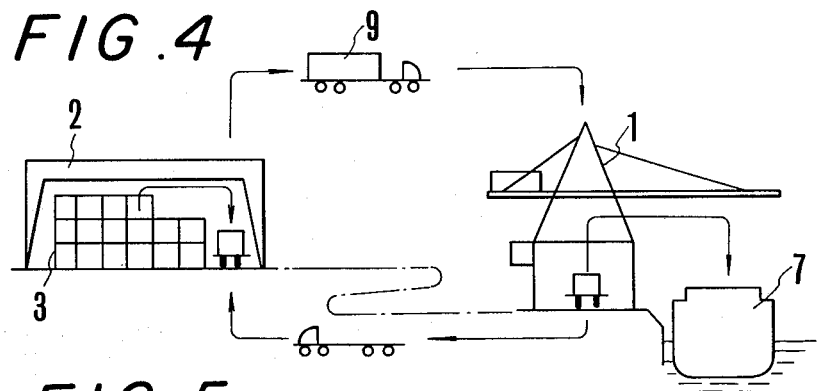
FIG. 4 is a diagram showing a manner of loading containers on a container ship which are collected in a container yard.

A container yard illustrated in FIG. 1 is equipped with loading and unloading machines 1 such as wharf cranes located in the transferring area for handling containers, portal cranes 2 which are free to move in the container yard for handling collected containers 3, a control center 4 responsive to cargo information received from a gate 5. The control center 4 controls the operation of cranes 1 and 2 and vehicles 6 for transporting the containers, and movement of the vehicles to a garage 8 for accommodating the vehicles 6. A container ship 7 is shown lying alongside the wharf.

Figure 5:
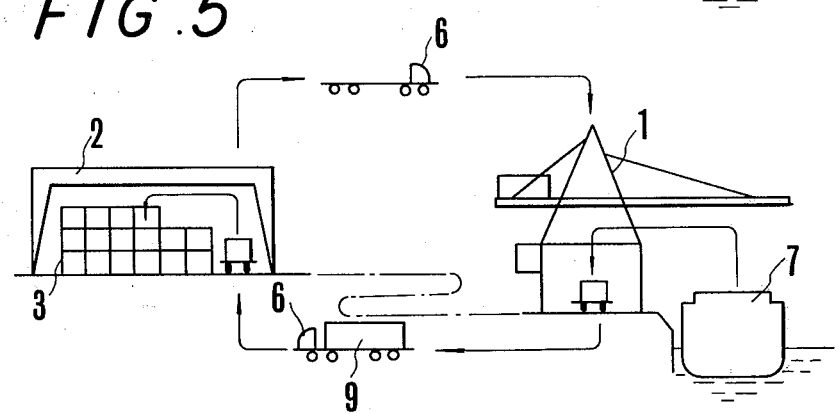
FIG. 5 is a diagram showing an unloading path from a container ship to a container yard.
Figure 6:
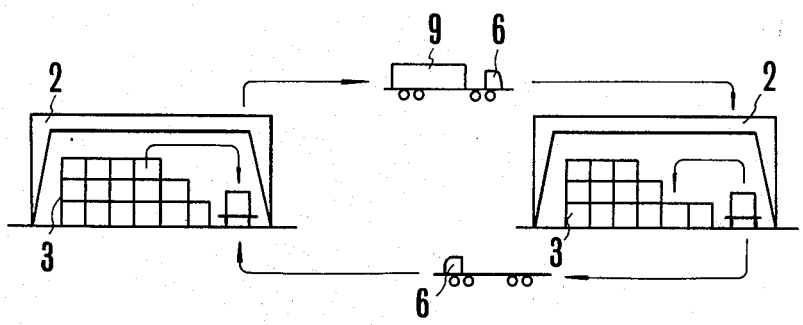
FIG. 6 is a diagram showing the shifting operation of containers in a container yard.

For the efficient operation of the container yard it is highly desirable to operate the cranes and transporting vehicles in an intimate operative relationship. Some of the basic operations in the container yard are shown in FIGS. 2 to 6. More particularly, FIG. 2 shows a receiving path for containers transported from inland to the container yard. FIG. 3 shows a delivery path for transferring containers collected in the yard to either a container ship or inland. FIG. 4 shows a loading path for loading containers on the container ship 7. FIG. 5 shows an unloading path for unloading containers from the container ship 7 to the container yard, and FIG. 6 illustrates shifting of the containers between container stacking lanes.

Heretobefore, the container handling operation in such container yards has been performed by the operators of the cranes who perform a predetermined command while observing individual containers. However, as the scale of the container yard becomes large, such operations relying upon the judgement of the operators often results in misidentification of the particular containers as well as a misidentification of the designated location at which the particular container is being collected or to be transferred, thereby increasing the tendency of misdispatch as well as misstacking. This also imparts a large mental load on the operators. To perform efficiently these complicated operations, it is necessary to process a large volume of business data including preparation of sequence lists required for the handling of the containers, preparation and renewal of ledgers for supervising the number of containers contained in the container yard, location and detection of the addresses of individual containers at the time of receiving and delivery, and other business data associated therewith. The processing of such extensive business data is of course expensive.

The invention contemplates the provision of a new method of handling a large number of containers capable of eliminating various problems in a big container yard.

One of the problems encountered in handling the containers in the past, lies in the identification of the specific numbers or symbols arbitrarily assigned to the containers by shippers or owners. The format, number of digits, the manner of using digits and the location on the container at which such specific numbers are attached, are quite arbitrarily selected by the shippers. Hence, it is extremely difficult to use these specific numbers as the key words for handling containers since they are not rational. Moreover, such known systems require additional operators for transmitting information regarding handling of the containers.

According to this invention, cargo numbers, or cargo sequence numbers are used which are effective in the yard alone for a definite interval of time during loading and unloading of the containers on and from the container ship lying alongside the wharf, during storage and when the containers pass through the gate between the container yard and the land. The cargo sequence numbers are determined to correspond to said specific numbers and are memorized in the control center. With these cargo sequence numbers, subsequent handling of the containers is controlled by using as key words the cargo sequence numbers having a lesser number of digits.

Figure 7:
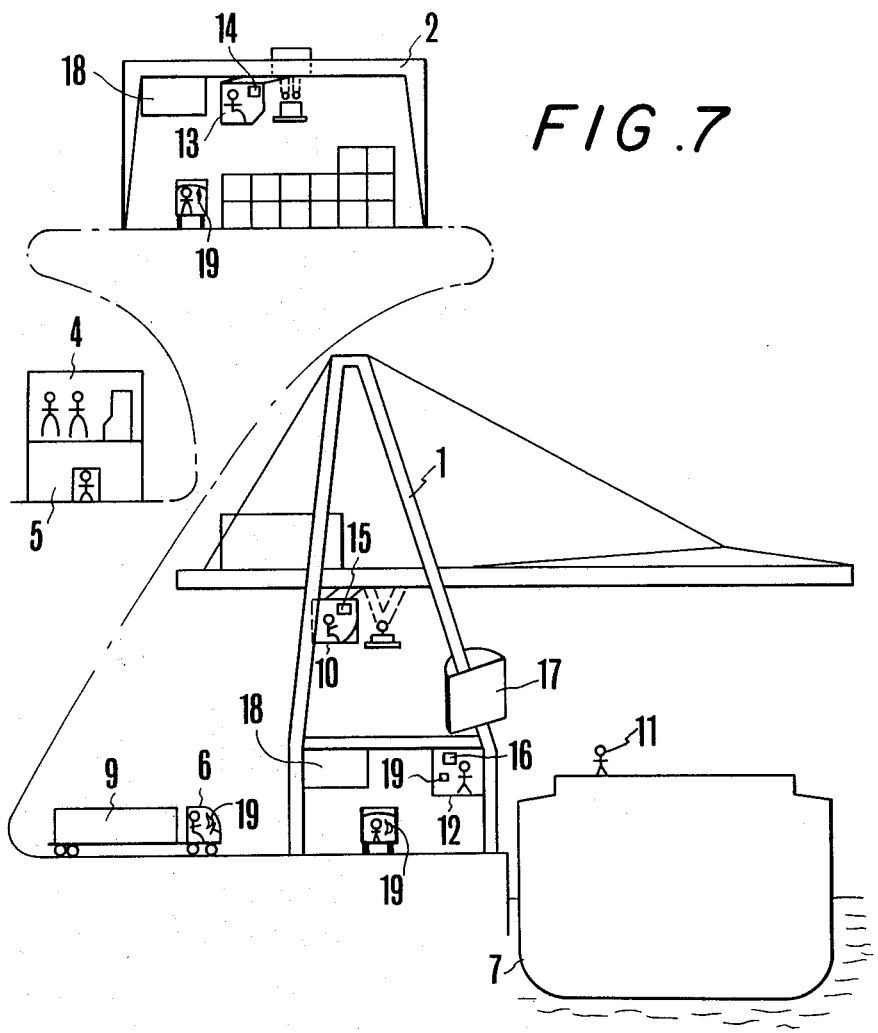
FIG. 7 is a diagram of container handling method utilized in the invention.

One example of the containers handling method embodying the invention will now be described with reference to FIGS. 7 and 8. FIG. 7 is a schematic diagram showing in more detail the arrangement and construction of the wharf crane 1, portal crane 2 control center 4, gate 5, vehicle 6, which may be used exclusively in the container yard or other type of truck carrying a container 9, and container ship 7. The wharf crane 1 is provided with a drivers cabin 10 equipped with an operation display panel 15; and a check man cabin 12 equipped with an operation display panel 16. The portal crane 2 is provided with a drivers cabin 13 also equipped with an cargo operation display panel 14 including an operation display panel, a drive guide panel, and an interlock indicating panel, not shown. The operation display panels 15 and 16 also include operation indicating panels and interlock indicating panels respectively. The wharf crane 1 is provided with a display device 17 for a signal man 11 shown standing on the container ship 7 and a display device 18 for the driver of the vehicle 6, on the front window thereof is shown a sequence list 19.

In the control center 4, a yard stacking plan is prepared based on the information of the container ship and of the shipper, and the yard stacking plan thus prepared is memorized in an input device (not shown) for controlling the cargo operation. Information concerning the arrival of the containers at the gate 5 are also memorized in the input device. At a proper time in advance of the arrival of the container ship, sequence lists for a loading or unloading operation are typed out in accordance with the information regarding the ship, a yard stacking map or a stowage plan and the typed out lists are distributed to those concerned with the cargo operation. All of these operations are performed by using the numbers assigned to the container yard or the cargo sequence numbers as the key words and the specific numbers assigned by shippers or owners described above are not utilized.

In the collecting or stacking operation in the container yard, when a land vehicle arrives at the gate 5 the following necessary steps are taken. A yard map in which a particular address in the yard to which the vehicle should be advanced and a predetermined sequence number recorded at control center 4, are handed over to the driver; and a predetermined cargo sequence number is marked on the vehicle and carried by it. Then the driver advances his vehicle toward the designated address. The driver of the vehicle confirms the vehicle number and the cargo sequence number given to him at the gate by observing the display device 18 on the portal crane 2 so that he can correctly transfer the container between his vehicle and the portal crane 2.

For performing loading of export containers, unloading of import containers and shifting of the containers in the container yard, vehicles utilized only in the yard are operated in intimate, interlocked relationship with the portal crane and the wharf crane. As has been described hereinabove a cargo sequence list is handed over to the driver of a vehicle assigned with a particular number so as to inform him of an allotted address. Accordingly, the driver can confirm his vehicle number as well as the cargo sequence number by observing the display device 18 mounted on the portal crane or wharf crane when he arrives at the designated address thus performing correct transfer of the container.

The operation of the portal and or wharf cranes should be made in interlocked manner with the vehicle and is performed in accordance with an operation command provided by the control center for each container to be handled. More particularly, in the case of the portal crane, the driver of the crane confirms the cargo operation command by observing the operation indicating panel of the display device installed in the drivers cabin. He then drives the crane to the designated address according to the displays of the direction, address, approach and arrival which are displayed on the operation indicating panel of the display device installed in the drivers cabin of the crane. When the crane arrives at the designated address, the driver confirms whether or not the number of the vehicle just coming beneath the crane coincides with the indicated vehicle number. Upon coincidence, the driver of the crane depresses a vehicle confirmation button, not shown, to inform the vehicle driver of such coincidence. Thereafter, the crane driver transfers the container whereupon a transfer completion signal is sent to the control center thus enabling the same to send the next command signal.

In the case of the wharf crane, a check man standing at the foot of the crane checks for the particular number and for damage to the container. A signal man standing on the container ship guides the container to a designated address in the container ship and supervises the loading operation in cooperation with the crane driver. A particular cargo command signal is transmitted to both the check man room and the crane drivers cabin and displayed in these rooms for each container to be handled. The check man standing on the wharf previously is handed a loading/unloading sequence list and checks whether the commanded sequence number, the vehicle number and the particular number of the container contained in the sequence list coincide with each other or not. When the check man informs the control center 4 that he has confirmed the particular number of the container and when the crane driver informs the control center that the cargo operation has been completed, a record is made that the cargo operation is completed and the next command signal is sent from the control center. The signal man on the container ship reads the container address in the ship by observing the display device 17 for the signal man and informs to the crane driver of the loading location.

The foregoing description outlines one example of operation of the method of container handling according to the invention. Some additional description will now be made with reference to FIG. 8. The flow of the control information is as follows. In FIG. 8, the control section for the wharf crane is shown by a block 81, the control section for the portal crane is shown by block 82, and the control center 4 and the gate are shown by a block 20. In response to a ship's cargo information 21, shipper information 22, gate information 23 and/or wharf information 24, the control center prepares a cargo plan which is transmitted to various associated parts of the system. A loading/unloading sequence 29, a yard map 30 and a shift sequence 31 are prepared based on a stowage plan 26, a stacking plan 27 and a shift plan 28 and these plans, sequences and map are supplied to vehicles 32 operating in the yard alone, or to a vehicle 33 for land transportion. The interlock operations with the crane are performed in accordance with these distributed plans, sequences and map. The control center 20 also transmits a command signal to the portal crane 82 or the wharf crane 81 through a two-way ground inductive radio set (GRB) 34, car mounted two-way inductive radio sets (CRB) 37 and 42 and automatic crane controllers (ACC) 38 and 43, to provide a cargo operation command signal comprising repeated cycles of a cargo operation command — an information of cargo operation completion — cargo operation command, thus performing the commanded cargo operation without any error.

Figure 8:
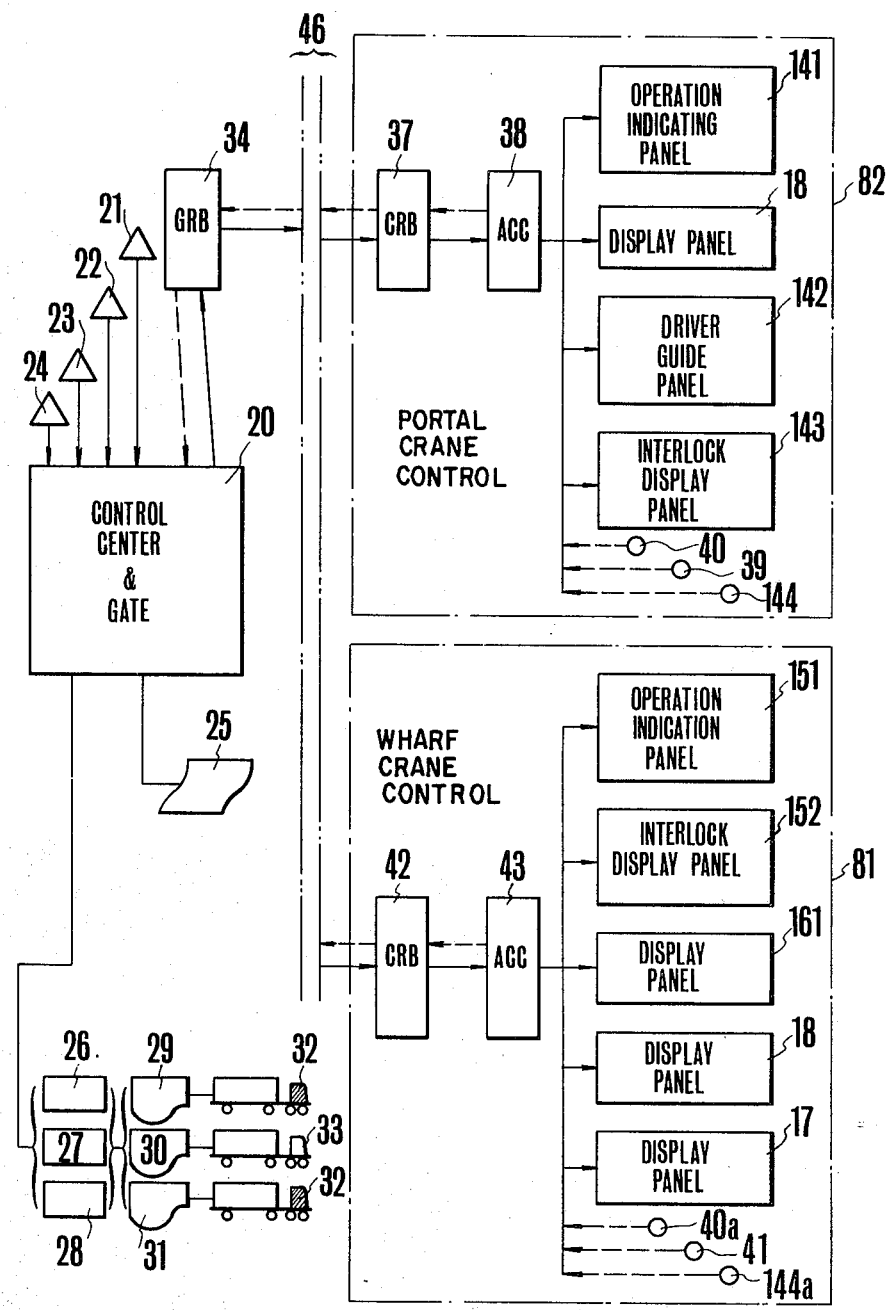
FIG. 8 is a block diagram showing the flow of informations utilized in this invention.

As shown in FIG. 8, an operation indicating panel 141, a driver guiding panel 142, an interlock display panel 143, an interlock switch 144, an operation completion confirmation push button 40, and a vehicle number confirmation push button 39 are installed in the drivers cabin of the portal crane. A display panel 18 for the vehicle driver is mounted on the exterior of the portal crane. The wharf crane is provided with an operation indicating panel 151, an interlock display panel 152, a check man display panel 161 installed in the check man room, a display panel 18 for the vehicle driver mounted on the wharf crane, a display panel 17 for the signal man, an interlock switch 144a, an operation completion confirmation push button 40a and a container number confirmation push button 41. All of these elements are installed in the drivers cabin of the wharf crane except the display panel 17 which is mounted on the foot of the wharf crane. An inductive radio channel 46 is available in the container yard for transmitting inductively coupled radio signals between the control center 20 and the portal and wharf crane units.

As has been described hereinabove, according to this invention, complicated container handling operations that are involved while utilizing the specific numbers for the containers assigned by the shippers or owners can be avoided. The portal crane, the wharf crane and the vehicles are controlled by utilizing the cargo sequence number and the vehicle number allotted for use only in the container yard. These numbers are used as common key words so that it is possible to positively prevent misloading and misdispatching. Moreover, since all operations are performed by confirming the displayed command signals from the control center it is not only possible to greatly decrease the fatigue of drivers of the container handling machines but also to improve the turn over rate of the containers in the container yard.

Although the invention has been described in connection with a seaside container yard, it should be understood that the invention is equally applicable to inland container yards for railroads, trucks, etc.

While the invention has been described in terms of a preferred embodiment thereof it should be understood that many changes and modifications will readily occur to one skilled in the art in the light of the above teachings without departing from the spirit and scope of the invention as defined in the appended claims.

What is claimed is:

1. In a method for handling containerized cargo in a container yard having a first container handling machine installed in the transferring area of said container yard, a second container handling machine operating in said yard, a plurality of wheeled transport vehicles for transporting the containers within the container yard, each of said container handling machines having controllable display means controllable from a control center, and a control center having computer means for receiving and storing input and output information concerning both the containers being processed by the yard and transport vehicles operating in the yard for commanding and supervising the loading, storing and unloading operations of said first and second container handling machines and of said transport vehicles; the improved method of handling containers in said container yard comprising the steps of providing a corresponding unique container yard assigned sequence number to each container by said control center and suitably labeling the container with the number, said number being stored in the control center and effective for use only while the container is in said container yard, assigning and applying a predetermined and different vehicle number to each transport vehicle operating within the container yard by said control center, said predetermined vehicle number being stored and used by the control center only while the transport vehicle is within said container yard, and displaying said container number and said vehicle number by said controllable display means mounted on said first and second container handling machines substantially simultaneously in point of time in accordance with an operation command from said control center during each handling operation, thereby enabling the operators of said container handling machines and said transport vehicles to mutually confirm the handling operation command from said control center for each container by utilizing said centrally controlled and substantially simultaneously displayed container number and vehicle number as a common key word.

2. The method according to claim 1 wherein said container is designated by a specific number previously assigned by a shipper or owner and said predetermined sequence number applied to said container by the container yard control center corresponds to said specific number.

3. The method according to claim 1 wherein said predetermined vehicle number is applied to said transport vehicles on a portion thereof observable by operators of said container handling machines.

4. The method according to claim 1 wherein the controllable display means associated with at least one of said container handling machines is positioned in a manner such that it can be additionally viewed and checked from a position exterior said container handling machine and said transport vehicles at the time of loading and unloading containers.

* * * * *